No. 663,063. Patented Dec. 4, 1900.
M. CLAUSEN.
HAT FASTENER.
(Application filed Sept. 1, 1900.)
(No Model.)

Witnesses:
George Barry Jr
Edward Vieser.

Inventor:
Marjorie Clausen
By Brown Ward
her Attorneys

THE NORRIS PETERS CO., PHOTO-LITHO., WASHINGTON, D. C.

UNITED STATES PATENT OFFICE.

MARJORIE CLAUSEN, OF HACKENSACK, NEW JERSEY, ASSIGNOR OF ONE-FOURTH TO BEHREND WINTJEN, OF NEW YORK, N. Y.

HAT-FASTENER.

SPECIFICATION forming part of Letters Patent No. 663,063, dated December 4, 1900.

Application filed September 1, 1900. Serial No. 28,726. (No model.)

*To all whom it may concern:*

Be it known that I, MARJORIE CLAUSEN, a citizen of the United States, and a resident of Hackensack, in the county of Bergen and State of New Jersey, have invented a new and useful Hat-Pin, of which the following is a specification.

My invention relates to hat-pins, with the object in view of providing a short pin which may be permanently retained within a hat and inserted and removed without tearing the body of the hat and which will at the same time maintain a secure hold of the mass of hair without injuring the scalp.

A practical embodiment of my invention is represented in the accompanying drawings, in which—

Figure 1:
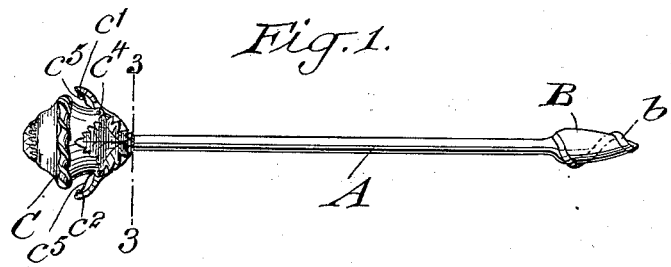
Figure 2:
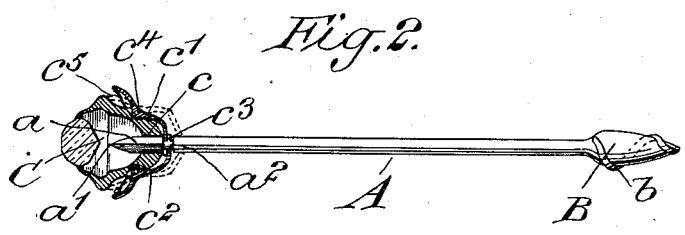
Figure 3:
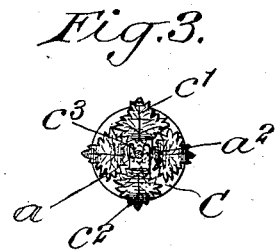
Figure 4:
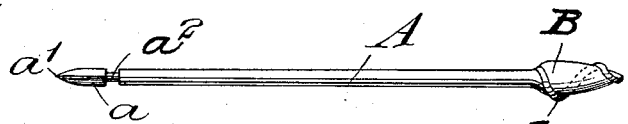

Figure 1 is a view of the pin in side elevation with the parts assembled. Fig. 2 is a similar view showing the head of the pin in longitudinal section. Fig. 3 is a transverse section along the line 3 3 of Fig. 1, and Fig. 4 is a view of the pin in detail.

A represents the shank of the pin. Its point, which is to come in contact with the hair, is enlarged, as shown at B, presenting a general cone shape. On the exterior of the cone-shaped point there is formed a rib $b$, which winds about the surface of the cone-shaped point B after the manner of a screw-thread, so that the pin may be rotated in one direction, and thereby forced into the mass of hair, and may be removed from the hair by being rotated in the opposite direction. The apex of the point B is sufficiently rounded to prevent the pin from piercing the scalp, and the winding-rib $b$, for screwing the pin into the mass of hair, is also rounded, so as to prevent abrasion of the scalp.

It is intended that the point B of the pin shall be larger than the hole through the side of the hat, thereby requiring the insertion of the shank through the side of the hat from the inside. To this end I provide the opposite end of the shank A of the pin with a squared portion $a$, terminating in a point $a'$, and intermediate of the squared portion $a$ and the rounded shank A, I provide an annular recess $a^2$.

The head of the pin is denoted by C and is made removable from the shank A, as follows: The head C may be of any ornamental design and is provided at its end toward the shank A with a squared socket $c$, adapted to fit with an easy sliding fit the squared portion $a$ of the shank. The head is further provided with one or two—in the present instance two—spring-actuated catches (denoted by $c'$ $c^2$) fulcrumed on the opposite sides of the head C and provided with bifurcated ends $c^3$, adapted to engage the shank of the pin in the recess $a^2$. The springs for holding the catches $c'$ $c^2$ normally closed into the recess $a^2$ of the shank may either be simple coil-springs around the pintles $c^4$ of the levers or there may be a little flat bar-spring $c^5$, such as is in common use, the particular form of spring forming no part of my present invention.

In operation the head C may be removed from the shank A by pressing the ends of the spring-catches toward one another, releasing their gripping ends from the shank, and the shank A may then be inserted from the inside of the hat through the wall of the hat or through an eyelet of suitable size set in the wall of the hat. The head C may then be placed in position on the pin, and because of the squared socket in the head in engagement with the squared portion $a$ of the shank the pin may be rotated in one direction or the other at pleasure to screw it into the mass of hair or remove it therefrom.

The present invention contemplates the use of a pin three inches or less in length to meet any objections that are commonly urged against the use of long pins reaching through the hat and criticised as "dangerous" weapons.

It is obvious that slight changes might be resorted to in the form and arrangement of the several parts without departing from the spirit and scope of my invention. Hence I do not wish to limit myself strictly to the structure herein set forth; but

What I claim is—

1. A hat-pin comprising a shank provided with an enlarged tapered point having a winding-rib thereon after the manner of a screw-thread and a removable head, substantially as set forth.

2. A hat-pin comprising a shank provided with a screw-like point and with a recess near its opposite end, a removable head and a spring-catch carried by the removable head for engaging the recess in the shank to hold the head in position, substantially as set forth.

3. A hat-pin comprising a shank provided with a screw-like point at one end, a squared portion terminating in a point at the opposite end, a recess intermediate of the squared portion and the shank, a removable head provided with a squared socket for engaging the squared portion on the shank and a spring-catch carried by the head for engaging the recess in the shank to hold the head in position, substantially as set forth.

In testimony that I claim the foregoing as my invention I have signed my name, in presence of two witnesses, this 9th day of March, 1900.

MARJORIE CLAUSEN.

Witnesses:
CHAS. S. CLAUSEN,
EDITH E. CORNING.